(12) United States Patent
Yoon

(10) Patent No.: US 11,642,975 B2
(45) Date of Patent: May 9, 2023

(54) AUTOMATED VALET PARKING SYSTEM AND METHOD, INFRASTRUCTURE AND VEHICLE THEREOF, COOPERATED WITH WIRELESS VEHICLE CHARGING SERVICE

(71) Applicants: HYUNDAI MOTOR COMPANY, Seoul (KR); KIA MOTORS CORPORATION, Seoul (KR)

(72) Inventor: Sung Won Yoon, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 459 days.

(21) Appl. No.: 16/724,715

(22) Filed: Dec. 23, 2019

(65) Prior Publication Data
US 2020/0198489 A1    Jun. 25, 2020

(30) Foreign Application Priority Data

Dec. 21, 2018  (KR) .................. 10-2018-0167793
Dec. 19, 2019  (KR) .................. 10-2019-0170406

(51) Int. Cl.
*B60L 53/36* (2019.01)
*B60L 53/12* (2019.01)
(Continued)

(52) U.S. Cl.
CPC .............. *B60L 53/36* (2019.02); *B60L 53/12* (2019.02); *B60L 58/12* (2019.02); *G05D 1/0225* (2013.01); *G08G 1/14* (2013.01)

(58) Field of Classification Search
CPC .......... B60L 53/36; B60L 53/12; B60L 58/12; B60L 53/38; B60L 2260/32;
(Continued)

(56) References Cited

U.S. PATENT DOCUMENTS

2017/0329346 A1*  11/2017  Latotzki ................. G08G 1/164
2018/0012156 A1*   1/2018  Voelz ................... G05D 1/0217
(Continued)

FOREIGN PATENT DOCUMENTS

| CN | 207020827 U |   | 2/2018 |             |
|----|-------------|---|--------|-------------|
| CN | 108312867 A |   | 7/2018 |             |
| CN | 108312867 A | * | 7/2018 | ..... B60L 53/60 |

OTHER PUBLICATIONS

Extended European Search Report dated Apr. 21, 2020 from the corresponding European Application No. 19219311.8, 10 pp.

*Primary Examiner* — Marthe Y Marc-Coleman
(74) *Attorney, Agent, or Firm* — Lempia Summerfield Katz LLC

(57) ABSTRACT

An automated valet parking method includes: activating an automated valet parking procedure, determining whether electrical charging of a vehicle is needed, setting a wireless charging service zone as a first target position when it is determined that the electrical charging of the vehicle is needed, transmitting the first target position and a first guide route leading to the first target position to the vehicle, setting an empty parking space as a second target position when the electrical charging of the vehicle is completed, and transmitting the second target position and a second guide route leading to the second target position to the vehicle.

12 Claims, 12 Drawing Sheets

(51) Int. Cl.
*B60L 58/12* (2019.01)
*G05D 1/02* (2020.01)
*G08G 1/14* (2006.01)

(58) Field of Classification Search
CPC ..... B60L 53/126; B60L 53/66; G05D 1/0225;
G08G 1/14; Y02T 10/70; Y02T 90/16;
Y02T 10/7072; Y02T 10/72; Y02T 90/14;
Y02T 90/12; B62D 15/0285; B60W
30/06
See application file for complete search history.

(56) References Cited

U.S. PATENT DOCUMENTS

2019/0386502 A1* 12/2019 Penilla .................. G06Q 10/20
2021/0380003 A1* 12/2021 Spiro .................... G07B 15/02

* cited by examiner

| Step | Infra | Vehicle |
|---|---|---|
| <1> AVPS START | * Recognize and qualify an appropriate user (by user ID and PW) and vehicle (by unique number assigned to vehicle)<br>* Manage driving authority (receiving driving authority from the user/return the driving authority to the user<br>* Transmit automated driving start instruction to vehicle | * perform engine ON/OFF or power ON/OFF according to the instruction of infra<br>* Lock the vehicle according to the instruction of infra |
| <2> DETERMINATION OF TARGET POSITION AND GUIDE ROUTE | * Determine the target position, guide route, and permissive driving area, and deliver those information to vehicle | |
| <3> AUTONOMOUS DRIVING | * Instruct automated driving (start, stop, re-start) to vehicle | * Drive along the guide route designated by infra within the permitted driving area at a speed of 10km/h or less<br>* Drive within the path and width designated by infra without deviation<br>* Drive along a curve with the minimum inner radius of the vent designated by the infra without deviation<br>* Drive on a path with the gradient less than or equal to the maximum gradient designated by infra |
| <4> POSITION MEASUREMENT (vehicle, obstacle) | * Be aware of and manage vehicle location<br>* Detect and recognize vehicles and obstacles (TBD), and monitor safety driving and parking operation of each vehicle (supervise) | * Estimate its own position<br>* Inform the infra of its estimated position / with the accuracy and frequency specified below (TBD)<br>* Inform the infra of its own status<br>* Detect the following obstacles (TBD) |
| <5> AUTONOMOUS PARKING | | * Park and Stop the vehicle at the target position designated by infra (equivalent to PAPS parking requirements) |

FIG. 4A

| Step | Infra | Vehicle |
|---|---|---|
| <6> EMERGENCY BRAKE | * Continue to instruct automated driving to vehicle when safety is ensured as a result of safety confirmation, and to instruct the vehicle to perform an emergency stop, if safety is not confirmed | * Start/emergency stop/re-start automated driving according to the instruction of infra<br>* perform an emergency stop in case where a potential hazard is determined as a result of the detection mentioned above<br>* Immediately decelerate at the rate of (TBD) m/s and stop, when the following conditions are met<br>(1) vehicle received an instruction from infra for E/S<br>(2) vehicle detected an obstacle (TBD)<br>* After coming to a stop, the vehicle shall remain stopped until it receives an instruction from infra to resume automated driving<br>* Vehicle shall re-start suspended driving or parking when it receives an instruction to start automated driving from the infra after confirming that there is no obstacle ahead in the path |
| <7> AVPS END | *After the vehicle completes automated driving and parking, the infra transmits Vehicle control release instruction to the vehicle | * Perform engine ON/OFF or power ON/OFF according to the instruction of infra<br>* Lock the cenicle according to the instruction of infra<br>* Mechanically fix or restrain wheels using such as the parking brake |
| <8> FAULT CONTROL (communication or vehicle fault) | * Detect communication faults between the infra and vehicle | * Detect faults in communication with infra during driving<br>* Detect vehicle's faults (e.g. part failure, human or animal remaining inside the vehicle, etc.)<br>* Perform emergency stop when above fault is detected<br>* After coming to a stop, the vehicle shall remain stopped until it receives an instruction from infra to resume automated driving |

FIG. 4B

| DATA | Contents | Transmit (T)/ Receive (R) | | Regularity(F)/ Event(E) Transmission | Note |
|---|---|---|---|---|---|
| | | Infrastructure | Vehicle | | |
| (1) Vehicle qualification information | ID number (VIN) to identify reach vehicle | R | T | E When entering the parking | |
| (2) Automated driving preparation instruction | — | T | R | E Right before automated driving start | This is also used for communication fault check by the vehicle |
| (3) Vehicle information notification | Vehicle state (normal stop/ driving/emergency stop, et c.) Vehicle position[should] | R | T | F (1 Hz) | |
| (4) Vehicle information response | — | T | R | F (1 Hz) | |
| (5) Target position + guide route Delivery | Target position + passing point location/Permitted time to pass through the point Maximum speed | T | R | E After automated driving instruction | |
| (6) Driving boundaries delivery | A group of lines to surround the permitted driving area | T | R | E after automated driving preparation instruction | |
| (7) Automated driving start instruction | — | T | R | E After delivery of guide route and driving boundaries, when restarting after emergency stop | |
| (8) Emergency stop instruction | — | T | R | E | |
| (9) Vehicle control release instruction | — | T | R | E | |

FIG. 5

AUTOMATED VALET PARKING SYSTEM AND METHOD, INFRASTRUCTURE AND VEHICLE THEREOF, COOPERATED WITH WIRELESS VEHICLE CHARGING SERVICE

CROSS-REFERENCE TO RELATED APPLICATION

This application claims priorities to and the benefit of Korean Patent Application Nos. 10-2018-0167793, filed on Dec. 21, 2018 and 10-2019-0170406, filed on Dec. 19, 2019, the entirety of each of which are hereby incorporated by reference.

TECHNICAL FIELD

The present disclosure relates to a system, method, infrastructure, and vehicle for performing automated valet parking. The present disclosure enables an unmanned vehicle to autonomously move to and park at an empty parking space by communicating with a parking infrastructure. The present disclosure enables an unmanned vehicle to autonomously move from a parking space to a pickup zone by communicating with a parking infrastructure.

BACKGROUND

The statements in this section merely provide background information related to the present disclosure and may not constitute prior art.

Many modern cities suffer from various parking-related issues. For example, there is a high risk of a car collision in a parking lot. For parking in crowded places such as large shopping centers, it takes long time and much energy to park a vehicle due to traffic congestion before entering a parking lot. In addition, it takes long time and much energy to locate an empty parking space even after entering a parking lot. In addition, there is inconvenience that a driver has to move to a spot at which his or her vehicle is parked at the time of leaving the visited area or that a driver often has difficulty in retrieving his or her vehicle without remembering the place where his or her vehicle is parked.

SUMMARY

The present disclosure relates to a system for and a method of supporting automated valet parking in conjunction with a wireless charging service, and a vehicle and infrastructure therefore. According to the present disclosure, a vehicle autonomously moves to an empty parking space and performs parking in the empty parking space by communicating with an infrastructure. In addition, according to the present disclosure, a vehicle autonomously moves from a parking space to a pickup zone by communicating with an infrastructure. In addition, according to the present disclosure, a vehicle autonomously moves to a wireless charging service zone so that the vehicle can be wirelessly charged and then autonomously moves to an empty parking space after the charging of the vehicle is completed.

According to one aspect of the present disclosure, there is provided an automated valet parking method including: activating an automated valet parking procedure; determining whether electrical charging of a vehicle is needed; setting a wireless charging service zone as a first target position when it is determined that the electrical charging of the vehicle is needed; transmitting, by an infrastructure, the first target position and a first guide route leading to the first target position to the vehicle; setting an empty parking space as a second target position when the electrical charging of the vehicle is completed; and transmitting the second target position and a second guide route leading to the second target position to the vehicle.

DRAWINGS

In order that the disclosure may be well understood, there will now be described various forms thereof, given by way of example, reference being made to the accompanying drawings, in which:

FIGS. 4A and 4B are diagrams illustrating operations performed by a parking infrastructure and a vehicle for automated valet parking in one form of the present disclosure;

FIG. 5 is a diagram illustrating a communication process performed by a vehicle and a parking infrastructure for automated valet parking in one form of the present disclosure;

Figure 1:
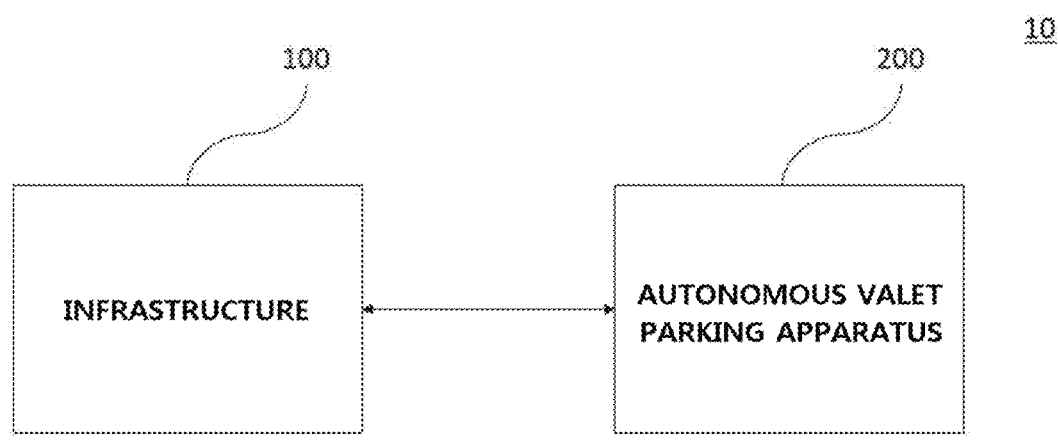
FIG. 1 is a diagram illustrating an automated valet parking system in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It is also noted that terms used in the detailed description of the present disclosure are defined below.

The term "driver" refers to a person who uses an automated valet parking service provided by an automated valet parking system.

The term "driving authority" refers to the authority to perform vehicle operations. The term "vehicle operation"

refers to an operation such as steering, accelerating, braking, gear shifting, vehicle starting, and door locking and unlocking of a vehicle.

The term "vehicle" refers to a vehicle having an autonomous valet parking feature.

The term "electric vehicle" refers to a vehicle that is driven by an electric motor that can be recharged in a cable plugging manner or a wireless charging manner.

The term "control center" refers to a facility that can monitor vehicles parked in a parking garage or facility, which determines a target position, a guide route, and a permitted driving area, and which transmits a driving start command or an emergency stop command to a vehicle.

The term "infrastructure" refers to a parking facility or sensors installed in the parking facility. Alternatively, in some cases, the term "infrastructure" may refer to a control center that controls a parking lot gate, vehicles in a parking lot, etc.

The term "target position" refers to an empty space available for parking. Alternatively, in a case where drivers leave a parking lot, the term "target position" may refer to a pickup area where the drivers get in their vehicles. Alternatively, the "target position" refers to a wireless-rechargeable parking slot equipped with a wireless charging system for wirelessly recharging a power source of a vehicle. For example, the target position may be a parking slot in which an electromagnetic induction coil is buried under the ground or is installed on the ground within the parking slot.

The term "guide route" refers to a route along which a vehicle drives to reach a target position. For example, in a case of performing parking, the guide route refers to a route along or according to which a vehicle needs to navigate from a drop-off area to an empty space. For example, the guide route is provided in the form of instructions, for example, "driving forwards a distance of 50 m and turning left at the corner". Alternatively, the guide route is a route extending from a drop-off point to a wireless-rechargeable parking slot.

The term "driving route" refers to a driving path along which a vehicle drives.

The term "permitted driving area" refers to an area where a vehicle can drive in a parking lot. For example, the permitted driving area includes the driving route. The permitted driving area is defined with barrier walls, parked vehicles, parking lines, etc.

FIG. 1 is a diagram illustrating an automated valet parking system in some forms of the present disclosure. Referring to FIG. 1, an automated valet parking system 10 includes a parking infrastructure 100 and an autonomous valet parking apparatus 200.

The infrastructure 100 refers to an apparatus, facility or system for operating, managing, and controlling the automated valet parking system. For example, the infrastructure 100 may be a parking facility. In some forms of the present disclosure, the infrastructure 100 includes sensors, communication devices, alarm devices, display devices, and a server that controls those devices and sensors. Alternatively, in some cases, the term "infrastructure" may refer to a control center that controls a parking lot gate, vehicles in a parking lot, etc.

The infrastructure 100 includes a communication circuit for performing communication and a processor for performing computation. In some forms of the present disclosure, the infrastructure 100 may further include sensors for detecting nearby objects and surrounding parameters. In the present disclosure, determinations and computations performed by the infrastructure 100 are performed by the processor.

The autonomous valet parking apparatus 200 refers to a vehicle that can perform autonomous valet parking. In some forms of the present disclosure, the autonomous valet parking apparatus 200 refers to a component or a set of components capable of performing autonomous valet parking.

Figure 2:
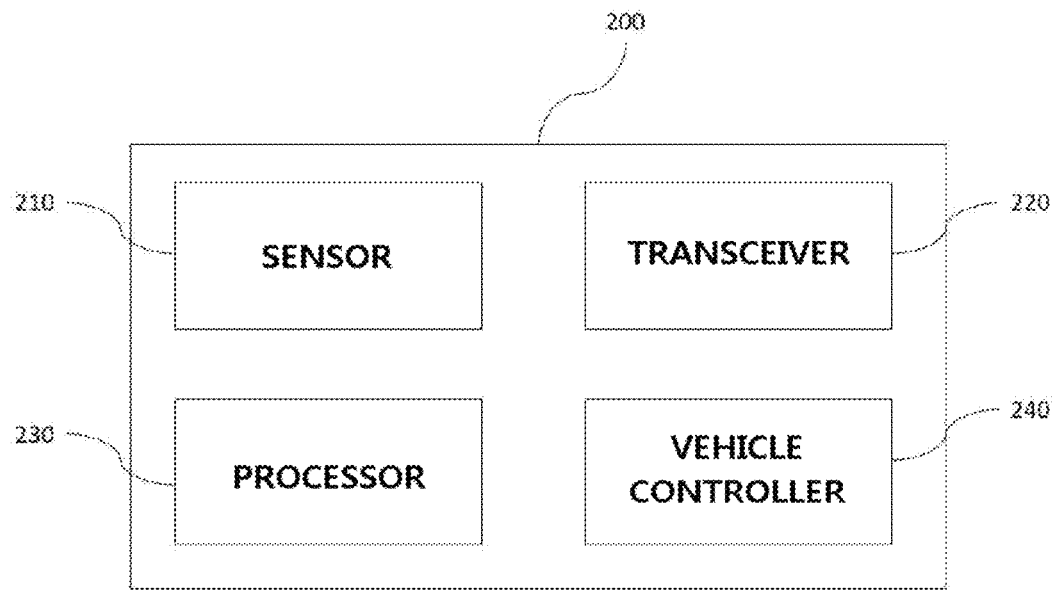
FIG. 2 is a diagram illustrating an autonomous valet parking apparatus in one form of the present disclosure.

FIG. 2 is a diagram illustrating an autonomous valet parking apparatus in some forms of the present disclosure. Referring to FIG. 2, the autonomous valet parking apparatus (for example, vehicle 200) includes a sensor 210, a communication circuit 220, a processor 230, and a vehicle controller 240.

The sensor 210 monitors the surroundings of the autonomous valet parking apparatus 200. In some forms of the present disclosure, the sensor 210 measures the distance between the autonomous valet parking apparatus 200 and a specific object or detects a nearby object. For example, the sensor 210 includes at least one of the sensors selected from among an ultrasonic sensor, a RADAR sensor, a LIDAR sensor, a camera, an infrared sensor, a thermal sensor, and a millimeter wave sensor.

The sensor 210 transmits data resulting from sensing or measuring to the communication circuit 220 or to the vehicle controller 230.

The communication circuit 220 exchanges data with the infrastructure 100. This communication is called vehicle-to-infra (V2I) communication. The communication circuit 220 communicates the data with other vehicles. This communication is called vehicle-to-vehicle (V2V) communication. The V2I communication and the V2V communication are collectively called vehicle-to-everything (V2X) communication. In some forms of the present disclosure, the communication circuit 220 receives data such as a target position, a guide rote, a driving route, an instruction, etc. from the infrastructure 100, processes the received data, and transmits the processed data to the processor 230. The communication circuit 220 transmits data collected and generated by the vehicle 200 to the infrastructure 100. In some forms of the present disclosure, the communication circuit 220 exchanges data with a terminal device of the driver of the vehicle 200.

The communication circuit 220 receives and transmits data by using a wireless communication protocol or a cable communication protocol. Examples of the wireless communication protocol include, but are not limited to, wireless LAN (WLAN), digital living network alliance (DLNA), wireless broadband (Wibro), world interoperability for microwave access (Wimax), global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSPDA), high speed uplink packet access (HSUPA), IEEE802.16, long term evolution (LTE), long term evolution-advanced (LTE-A), wireless mobile broadband service (WMBS), Bluetooth, infrared data association (IrDA), ultra-wideband (UWB), ZigBee, near field communication (NFC), ultra sound communication (USC), visible light communication (VLC), Wi-Fi, and Wi-Fi direct. Examples of the cable communication protocol include, but not limited to, wired local area network (LAN), wired wide area network (WAN), power line communication (PLC), USB communication, Ethernet communication, serial communication, and optical/coaxial cable communication. Other protocols that support communication between devices fall within the definition of the communication protocol that is used in some forms of the present disclosure.

The processor 230 controls the overall operation of the vehicle 200. The processor 230 controls the vehicle controller 240 on the basis of the data transmitted from the sensor 210 and the communication circuit 220. In some forms of the present disclosure, the processor 230 generates a control signal for adaptively controlling the vehicle controller 240 according to the data transmitted from the infrastructure 100 and transmits the control signal to the vehicle controller 240.

That is, the processor 230 refers to a device that performs a series of computations or makes a series of determinations to control the vehicle 200 for the purpose of autonomous valet parking. The processor 230 may be a processor by which a program including instructions for performing automated valet parking is executed. Examples of the processor 230 include a central processing unit (CPU), a microcontroller unit (MCU), an application specific integrated circuit (ASIC), a field programmable gate array (FPGA), and a graphic processing unit (GPU) but are not necessarily limited thereto.

The vehicle controller 240 controls the operation of the vehicle 200 according to the control signal issued by the processor 230. In some forms of the present disclosure, the vehicle controller 240 controls the vehicle 200 in response to the control signal transmitted from the processor 230. For example, the vehicle controller 240 controls various vehicle operations such as driving, stopping, resuming of driving, steering, accelerating, decelerating, parking, lamp lighting, alarm sounding, etc.

That is, it will be appreciated that the vehicle controller 240 can perform all the functions for controlling the operations of the vehicle 200. That is, the vehicle controller 240 may include a driving unit, a braking unit, a steering unit, an acceleration unit, an alarm unit, and a lighting unit.

On the other hand, although not described herein, the operations and/or functions of the vehicle 200 described in the description herein are performed by the conjunction of one or more components selected from among the sensor 210, the communication circuit 220, the processor 230, and the vehicle controller 240.

Figure 3:
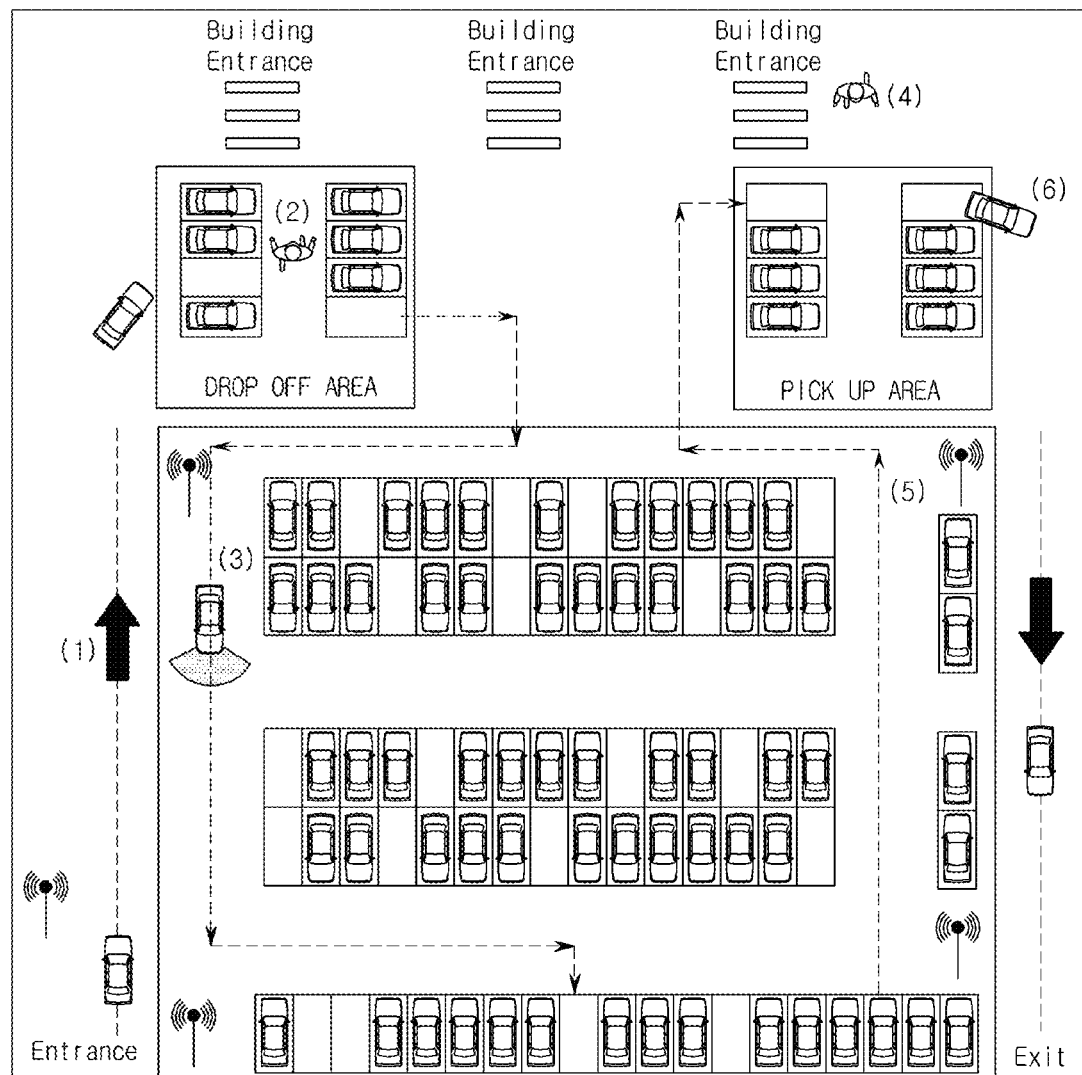
FIG. 3 is a conceptual diagram illustrating an automated valet parking system and method in one form of the present disclosure.

FIG. 3 is a conceptual diagram illustrating an automated valet parking system and method in some forms of the present disclosure.

Referring to FIG. 3, in step (1), a driver drives a vehicle to a drop-off zone in a parking lot.

In step (2), the drivers leave the vehicle at the drop-off zone and the authority to drive or control the vehicle is delegated to the infrastructure.

In step (3), the infrastructure searches for empty parking slots among all the parking slots in the parking lot and assigns a suitable empty parking slot among the empty parking slots to the vehicle. The infrastructure determines a guide route which guides the vehicle to the assigned empty parking slot. After the parking slot and the guide route are determined, the vehicle autonomously drives along the guide route to reach the assigned parking slot and performs autonomous parking at the parking slot.

In step (4), the driver moves to a pickup zone where the vehicle will pick up the driver when the driver wants to leave the parking lot.

In step (5), the infrastructure determines a suitable target position. For example, the suitable target position may be an empty parking slot of multiple parking slots within the pickup zone. The infrastructure determines a guide route which leads the vehicle to the target position. After the target position and the guide route are determined and transmitted to the vehicle, the vehicle autonomously drives along the guide route to reach the target position and performs autonomous parking.

In step (6), the driver arrives at the pickup zone and takes over the authority to drive the vehicle. The driver drives the vehicle toward the exit of the parking lot.

FIGS. 4A and 4B are diagrams illustrating operations performed by a parking infrastructure and a vehicle for automated valet parking in some forms of the present disclosure.

In step (1), operations of the infrastructure and the vehicle to start automated valet parking are performed. The infrastructure identifies the driver and the vehicle and determines whether the driver and the vehicle are qualified. For example, the infrastructure determines whether the driver is a qualified driver by reading an identification number (ID) or a password input by the driver. In addition, the infrastructure determines whether the vehicle is a qualified vehicle by reading to a vehicle identification number thereof. The vehicle can turn on and off the engine by itself. The vehicle can turn on and off the power supply by itself. For example, a state in which the engine of the vehicle is turned off and the power supply is turned on is referred to as an accessory-on (ACC-On) state. The engine on/off and the power supply on/off of the vehicle are performed according to instructions transmitted from the infrastructure or automatically performed without depending on the instructions transmitted from the infrastructure. The vehicle can lock and unlock the doors by itself. The locking/unlocking of the vehicle doors is performed according to instructions transmitted from the infrastructure or is automatically performed without depending on the instructions from the infrastructure. When the vehicle proceeds to an autonomous parking step, it is preferable to lock the vehicle doors. In addition, the authority to drive the vehicle is delegated to the infrastructure from the vehicle. The driving authority means an authority to control vehicle operations. The vehicle operations include steering, accelerating, braking, gear shifting, ignition turning, and door locking and unlocking. Since the driving authority is delegated to the infrastructure, the infrastructure takes complete control of the vehicle during the automated valet parking of the vehicle. Accordingly, the likelihood that an unintended operation of the vehicle occurs is lowered and vehicle accidents in the parking lot are prevented. However, in some cases, the driving authority may be partially delegated to the infrastructure so that the vehicle can still control some of the vehicle operations, or the driving authority may be shared by the vehicle and the infrastructure. For example, a braking operation may be performed when an emergency occurs during the autonomous valet parking procedure. Therefore, it is preferable for the vehicle to apply a brake without intervention of the infrastructure when the vehicle senses a danger with help of an ADAS sensor. In addition, the vehicle checks whether a person or animal is present in the vehicle. Since a parking duration from the completion of the autonomous valet parking to the discharging of the vehicle from a parking lot is long, if a person or animal is accidently left in the vehicle, the person or animal would be in danger. Therefore, it is important to provide that the vehicle is empty before the vehicle is parked. Whether a person or animal is present in the vehicle may be checked with a sensor mounted on the vehicle.

In some forms of the present disclosure, the infrastructure sets a plurality of (i.e., n) time frames for a plurality of vehicles, respectively. For example, when three vehicles enter a parking lot, the three vehicles are allocated with a first time frame, a second time frame, and a third time frame, respectively. The n time frames are used by the vehicles distinguish their guide route transmitted from the infrastructure from the others.

In step (2), a process of determining a target position, a guide route, and a driving route is performed. The determination of the target position, the guide route, and the driving route is performed by the infrastructure. The target position, the guide route, and the driving route determined by the infrastructure are delivered from the infrastructure to the vehicle.

The target position is a final destination to be reached by the vehicle. When a vehicle enters a parking lot, the target position may be an empty parking slot in a normal parking zone in the parking lot. When a vehicle exits a parking lot, the target position may be an empty parking slot in a pickup zone in the parking lot. Alternatively, the target position may be a specific spot in the vicinity of an empty parking slot. For example, when there are several successive empty parking slots in a specific area of the parking lot, the target position may be a specific spot in the vicinity of the specific area having the empty parking slots. In this case, the vehicle autonomously drives to the specific spot, and the autonomous parking function of the advanced driver-assistance system (ADAS) mounted in the vehicle is activated so that the vehicle can be parked in a desired parking slot in the vicinity of the specific spot. The autonomous parking function of the ADAS may be a partially automated parking system (PAPS). In this case, the efficiency of management of available parking spaces can be improved. In this case, it is not necessary for the infrastructure to accurately calculate the target position. That is, only rough estimation for the target position is desired. Therefore, it is possible to reduce computing resources for data processing.

The guide route is a path along which the vehicle needs to autonomously drive in the parking lot. The guide route is provided to the vehicle in the form of a series of instructions, such as driving forwards 10 meters straight, turning right at the first corner, driving forwards 20 meters straight, turning left, etc. Alternatively, the guide route is provided to the vehicle in the form of lines including straight lines and curved lines drawn on a parking lot map. The lines indicate a driving lane extending from the current location of the vehicle to the target position on the parking lot map. Alternatively, the guide route is composed of multiple waypoints and one target position marked on a parking lot map. For example, the guide route includes three pillars A1, B2, and C3 as the multiple waypoints and a parking slot D23 as the target position. When the guide route is expressed in the form of multiple waypoints and a target position, information on straight and/or curved lines and distances (for example, 10 m) is not required. Therefore, this guide route reduces the amount of information for V2I communication.

In some forms of the present disclosure, the guide transmitted to the vehicle may be composed of light-emitting devices. For example, the light-emitting devices are LED lamps. When the light-emitting devices illuminate, the guide route is displayed on the ground surface. In this case, the light-emitting devices are LED lamps that are buried in the ground of the parking lot. Alternatively, the light-emitting devices may be laser lamps installed on the ceiling, the wall surface, or pillars in a manner that the laser lamps emit a laser beam toward the ground surface of the parking lot. The vehicle detects illumination of the light-emitting devices with built-in sensors, thereby receiving or recognizing the guide route. For example, the vehicle may detect illumination of each of the light-emitting devices with the use of a front camera sensor.

In step (3), an autonomous driving operation is performed in the parking lot. The autonomous driving of the vehicle includes driving, stopping, and re-driving. The autonomous driving of the vehicle is performed according to instructions transmitted from the infrastructure to the vehicle. Alternatively, the autonomous driving of the vehicle may be performed without relying on the instructions transmitted from the infrastructure. The vehicle can autonomously drive to the target position along the guide route within a permitted driving area. During the driverless autonomous driving of the vehicle, the vehicle is controlled to drive at a preset speed or below. This preset speed may be a value transmitted from the infrastructure to the vehicle or may be a value stored in the vehicle. In addition, the vehicle is controlled not to deviate beyond an error margin of the given guide route when driving along the guide route. This preset error margin may be a value transmitted from the infrastructure to the vehicle or may be a value stored in the vehicle. In addition, the vehicle may turn with a predetermined minimum turning radius when it is desired to turn during the autonomous driving along the guide route. This preset minimum turning radius may be a value transmitted from the infrastructure to the vehicle or may be a value stored in the vehicle. The vehicle is controlled not to exceed a predetermined maximum acceleration value when autonomously driving along the guide route. This preset maximum acceleration value may be a value transmitted from the infrastructure to the vehicle or may be a value stored in the vehicle.

In step (4), a position measurement operation is performed. The target of the position measurement may be a vehicle to be parked in a parking lot, an obstacle existing in the parking lot, or a vehicle that is already parked in the parking lot. The infrastructure measures the position of the vehicle or the obstacle and stores the measured position in a database. The infrastructure identifies and detects vehicles or obstacles and monitors the safety of each of the plurality of vehicles in the parking lot. In addition, the infrastructure monitors the operating state of the vehicle that is performing autonomous parking after reaching the target position and transmits an instruction on the basis of the results of the monitoring. The vehicle measures its position on its own. The vehicle transmits the measured position to the infrastructure. The error of the position measured by the vehicle needs to be within a predetermined error range. The predetermined error range is determined by the infrastructure. The vehicle detects obstacles present around the vehicle, measures the positions of the obstacles, and transmits the measured positions of the respective obstacles to the infrastructure. The communication between the vehicle and the infrastructure is performed at a predetermined frequency.

In step (5), an autonomous parking operation is performed by the vehicle. The autonomous parking refers to an operation in which the vehicle that has reached around the target position driverlessly goes into a target parking slot. The vehicle performs autonomous parking by sensing nearby obstacles or nearly vehicles that are parked, with the help of a distance sensor mounted on the vehicle. Examples of the distance sensor mounted on the vehicle include an ultrasonic sensor, a RADAR sensor, a LIDAR sensor, and a camera.

In step (6), an emergency braking process is performed. The emergency braking of the vehicle is performed according to instructions transmitted from the infrastructure or may be performed on its own when the vehicle detects an obstacle. The infrastructure instructs the vehicle to apply an emergency brake when it is determined that an area around the vehicle is unsafe. When the infrastructure determines that the surroundings of the vehicle become safe after the emergency braking is performed, the infrastructure orders the vehicle to resume autonomous driving or autonomous parking. When the vehicle detects an obstacle, the vehicle applies an emergency brake on its own. In addition, the vehicle reports to the infrastructure of the emergency braking that is performed by itself or the type or location of an obstacle which is the cause of the emergency braking. The vehicle reduces its speed according to a predetermined deceleration value preset for the emergency braking. This predetermined deceleration value is a value determined by the infrastructure or a value stored in the vehicle. The predetermined deceleration value may be determined according to the type of an obstacle, the position of an obstacle, and the distance between the vehicle and an obstacle. The vehicle resumes autonomous driving or autonomous parking upon receiving a resumption instruction for the autonomous driving or autonomous parking from the infrastructure. Alternatively, the vehicle resumes the autonomous driving or autonomous parking when it confirms that the obstacle is removed. The vehicle reports to the infrastructure of the resumption of autonomous driving or autonomous parking and of the removal of the obstacle.

In step (7), the automated valet parking procedure is finished. After the vehicle has completed autonomous driving and autonomous parking, the infrastructure issues a control release instruction to the vehicle. The vehicle can turn on and off the engine and turn on and off the power supply according to instructions received from the infrastructure or without depending on the instructions from the infrastructure. In addition, the vehicle can lock and unlock the vehicle doors according to instructions received from the infrastructure or without depending on the instructions from the infrastructure. Further, the vehicle can apply a parking brake according to instructions received from the infrastructure or without depending on the instructions from the infrastructure.

In step (8), an error control operation is performed. The error control is performed when an error occurs in communication between the vehicle and the infrastructure and/or when a mechanical error of the vehicle occurs. The infrastructure monitors communication between the infrastructure and the vehicle to detect whether a communication error occurs. The vehicle detects a communication error by monitoring the communication between the infrastructure and the vehicle. The vehicle detects whether a mechanical error occurs by monitoring operating states of built-in accessories including sensors mounted thereon. The vehicle detects the presence of a person or animal in the vehicle and applies an emergency brake when the presence of a person or animal is detected. The vehicle resumes autonomous parking or autonomous driving according to instructions received from the infrastructure when the vehicle is in an emergency stop state. Alternatively, the vehicle may determine, by itself, whether the cause of the emergency braking is removed and resumes autonomous parking or autonomous driving when the cause of the emergency parking is removed.

FIG. 5 is a diagram illustrating a communication process performed by a vehicle and a parking infrastructure for automated valet parking in some forms of the present disclosure.

In step (1), vehicle qualification information is delivered from the vehicle to the infrastructure. The vehicle qualification information includes an identifier that distinguishes each vehicle from the other vehicles. For example, the vehicle qualification information may be a unique vehicle number (for example, license plate number) of the vehicle. The vehicle qualification information is transmitted at a stage in which the autonomous valet parking procedure is started after the vehicle enters a parking lot and (see (1) of FIG. 4A).

In step (2), an autonomous valet parking preparation instruction is transmitted from the infrastructure to the vehicle. The autonomous valet parking preparation instruction is transmitted before the autonomous driving of the vehicle begins.

In step (3), vehicle information is transmitted from the vehicle to the infrastructure. The vehicle information includes state information of the vehicle and position information of the vehicle. The state information of the vehicle includes whether the vehicle is driving, whether the vehicle is stopped, or whether the vehicle is in an emergency stop state. The vehicle information is transmitted periodically at a specific frequency (for example, 1 Hz which means once per second). The vehicle information is used as a parameter to determine whether a communication error has occurred between the vehicle and the infrastructure. For example, when the vehicle information does not reach the infrastructure at a specific time that is estimated according to the communication frequency, the infrastructure determines that an error has occurred in communication between the vehicle and the infrastructure.

In step (4), an acknowledgement of the reception of the vehicle information is transmitted from the infrastructure to the vehicle. The acknowledgement of the reception of the vehicle information is transmitted at the same frequency as the transmission of the vehicle information that is transmitted in step (3). Therefore, the acknowledgement of the reception of the vehicle information is used as a parameter to determine whether an error has occurred in communication between the vehicle and the infrastructure. For example, when the vehicle information does not reach the infrastructure at a specific time that is estimated according to the communication frequency, the infrastructure determines that an error has occurred in communication between the vehicle and the infrastructure.

In step (5), a target position and a guide route are delivered from the infrastructure to the vehicle. The delivery of the target position and the guide route may be performed either before or after an autonomous valet parking start instruction is transmitted from the infrastructure to the vehicle.

In step (6), driving area boundary information is transmitted to the vehicle from the infrastructure. The driving area boundary information includes landmarks (for examples, lines demarcating parking slots, a central line, and lane boundary lines demarcating a driving lane) that mark the boundaries of a permitted driving area. The transmission of the driving area boundary information is performed after the autonomous valet parking preparation instruction is delivered. This driving area boundary information is transmitted from the infrastructure to the vehicle in the form of a parking lot map.

In step (7), the autonomous valet parking start instruction is transmitted from the infrastructure to the vehicle. The transmission of the autonomous valet parking start instruction is performed after the guide route and the driving area boundary information are delivered. Alternatively, the autonomous valet parking start instruction is transmitted when the cause of the emergency braking is removed.

In step (8), an emergency braking instruction is transmitted to the vehicle from the infrastructure.

In step (9), a vehicle control release instruction is transmitted to the vehicle from the infrastructure. The delivery of the vehicle control release instruction is performed after the vehicle is autonomously parked at a parking slot.

Figure 6:
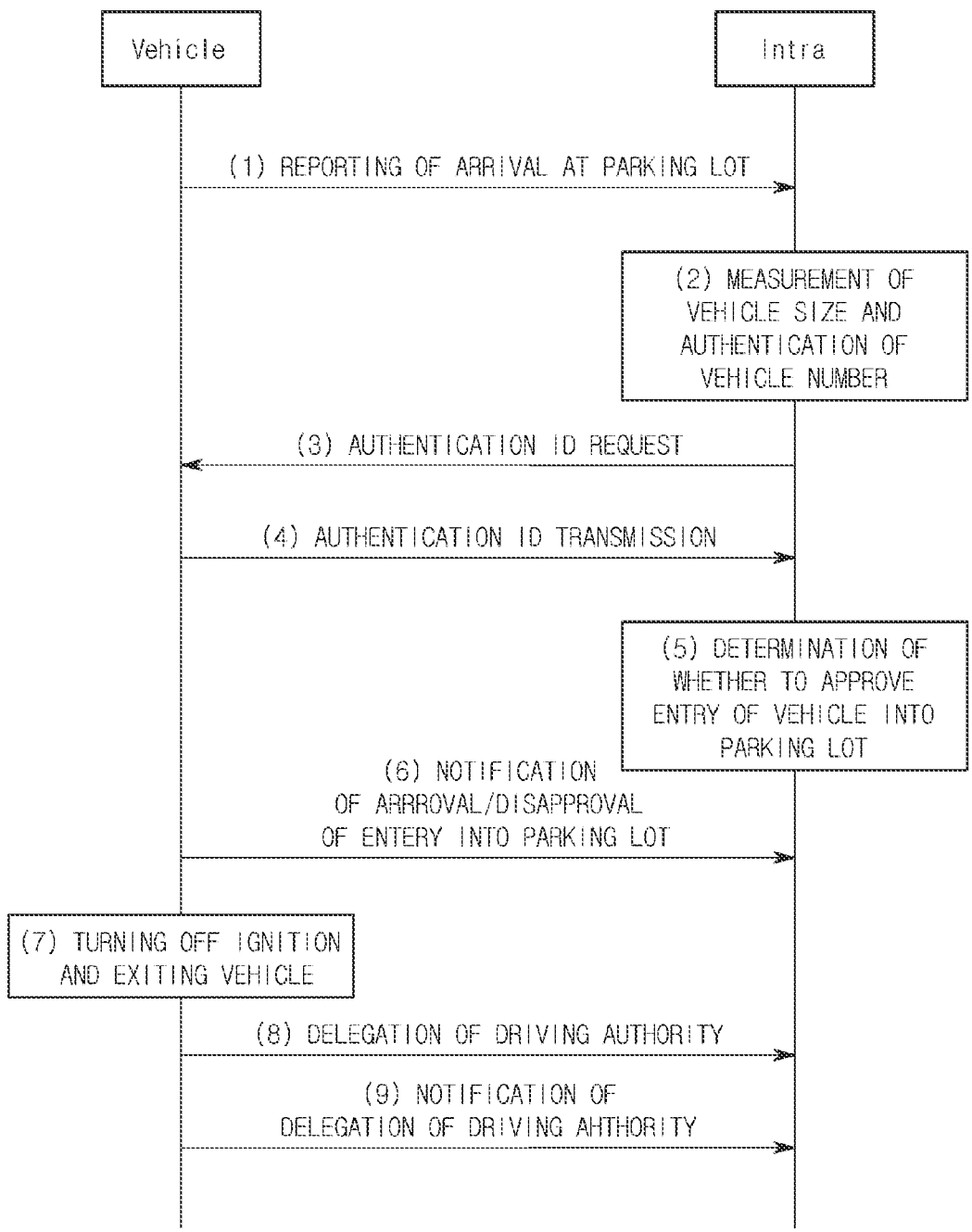
FIG. 6 is a diagram illustrating a communication process performed by a vehicle and a parking infrastructure for automated valet parking in one form of the present disclosure.

FIG. 6 is a diagram illustrating a communication process performed between a parking infrastructure 100 for automated valet parking and a vehicle 200.

In step (1), the vehicle 200 enters a parking lot and stops at a predetermined stop position. This stop position may be an entrance gate of a parking lot. The vehicle 200 reports its arrival to the infrastructure 100. In step (2), the infrastructure 100 measures the dimensions of the vehicle 200 and authenticates the vehicle 200 on the basis of an authentication ID of the vehicle 200. In step (3), the infrastructure 100 transmits an authentication ID submission request to the vehicle 200. In step (4), the vehicle 200 transmits the authentication ID to the infrastructure 100. In step (5), the infrastructure 100 determines whether to allow entry of the vehicle 200 into the parking lot on the basis of the received authentication ID. In step (6), the infrastructure 100 notifies the vehicle whether the vehicle 200 is permitted to enter the parking lot according to the results of the authentication. For example, the infrastructure 100 displays a message indicating approval or disapproval of the entry of the vehicle into the parking lot on a display panel installed around the stop position. The driver drives the vehicle 200 to a drop-off zone when the entry of the vehicle into the parking lot is approved. In step (7), the driver turns off the ignition of the vehicle 200, gets out of the vehicle 200, locks the vehicle doors, and leaves the drop-off zone. In step (8), the authority to drive the vehicle 200 is delegated from the vehicle 200 (or the driver) to the infrastructure 100. In addition, in step (9), the infrastructure 100 notifies the driver that it takes the authority to control the vehicle 200 in the parking lot. Such a notification is sent to a driver's smart device through a mobile communication network.

Figure 7:
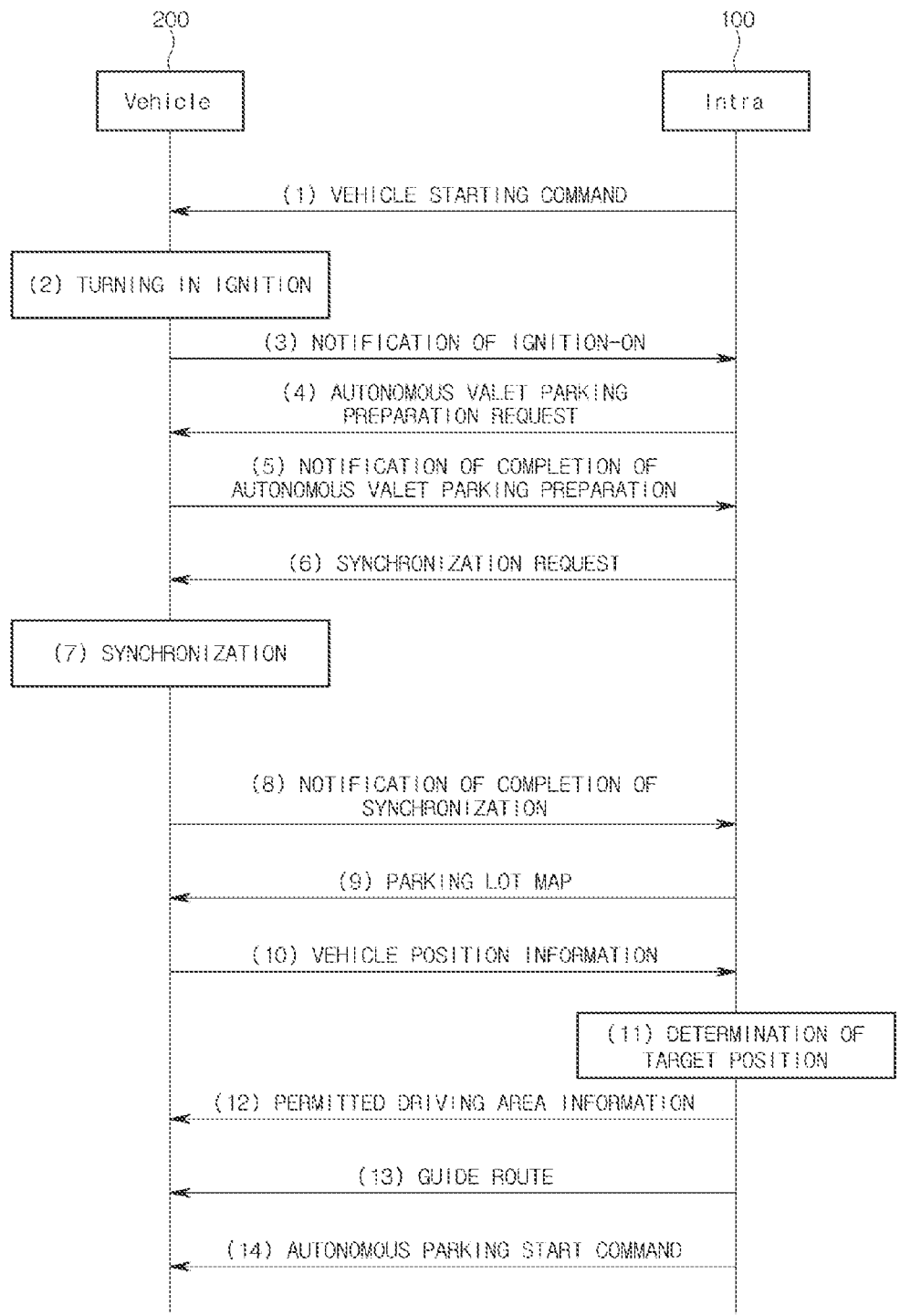
FIG. 7 is a diagram illustrating a communication process performed by a vehicle and a parking infrastructure for automated valet parking in one form of the present disclosure.

FIG. 7 is a diagram illustrating a communication process performed between a parking infrastructure 100 for automated valet parking and a vehicle 200.

In step (1), the infrastructure 100 transmits an ignition turning-on request to the vehicle 200. In step (2), the vehicle 200 turns on the ignition according to the ignition turning-on request transmitted from the infrastructure 100. In step (3), the vehicle 200 turns on the ignition and then notifies the infrastructure 100 that the ignition is turned on. In step (4), the infrastructure 100 transmits an automated valet parking preparation request to the vehicle 200. In step (5), the vehicle 200 transmits a reply to the automated valet parking preparation request to the infrastructure 100. The reply is a message of OK indicating that the preparation for automated valet parking is completed or a message of NG indicating that the preparation for automated valet parking is not completed. In step (6), the infrastructure 100 transmits a synchronization request to the vehicle 200. The synchronization request is a request for instructing synchronization of time such that the timer of the infrastructure 100 is synchronized with the timer of the vehicle 200. For example, the synchronization request includes information about time indicated by the timer of the infrastructure 100. In step (7), the vehicle 200 performs the synchronization according to the synchronization request. In step (8), the vehicle 200 transmits a reply indicating that the synchronization is completed to the infrastructure 100. For example, until the synchronization between the infrastructure 100 and the vehicle 200 is completed, a plurality of synchronization requests may be transmitted from the infrastructure 100 to the vehicle 200. In step (9), the infrastructure 100 transmits parking lot map information to the vehicle 200. The parking lot map information includes landmark information. In step (10), the vehicle 200 estimates or calculates the position of the vehicle 200 on the basis of the transmitted landmark information, and the vehicle 200 transmits the estimated position of the vehicle 200 to the infrastructure 100. In step (11), the infrastructure 100 determines a target position (for example, parking position). In step (12), the infrastructure 100 transmits information on a permitted driving area to the vehicle 200. For example, the infrastructure 100 transmits boundary information of the permitted driving area to the vehicle 200. In step (13), the infrastructure 100 transmits a guide route to the vehicle 200. In step (14), the infrastructure 100 transmits an automated valet parking start instruction to the vehicle 200.

Figure 8:
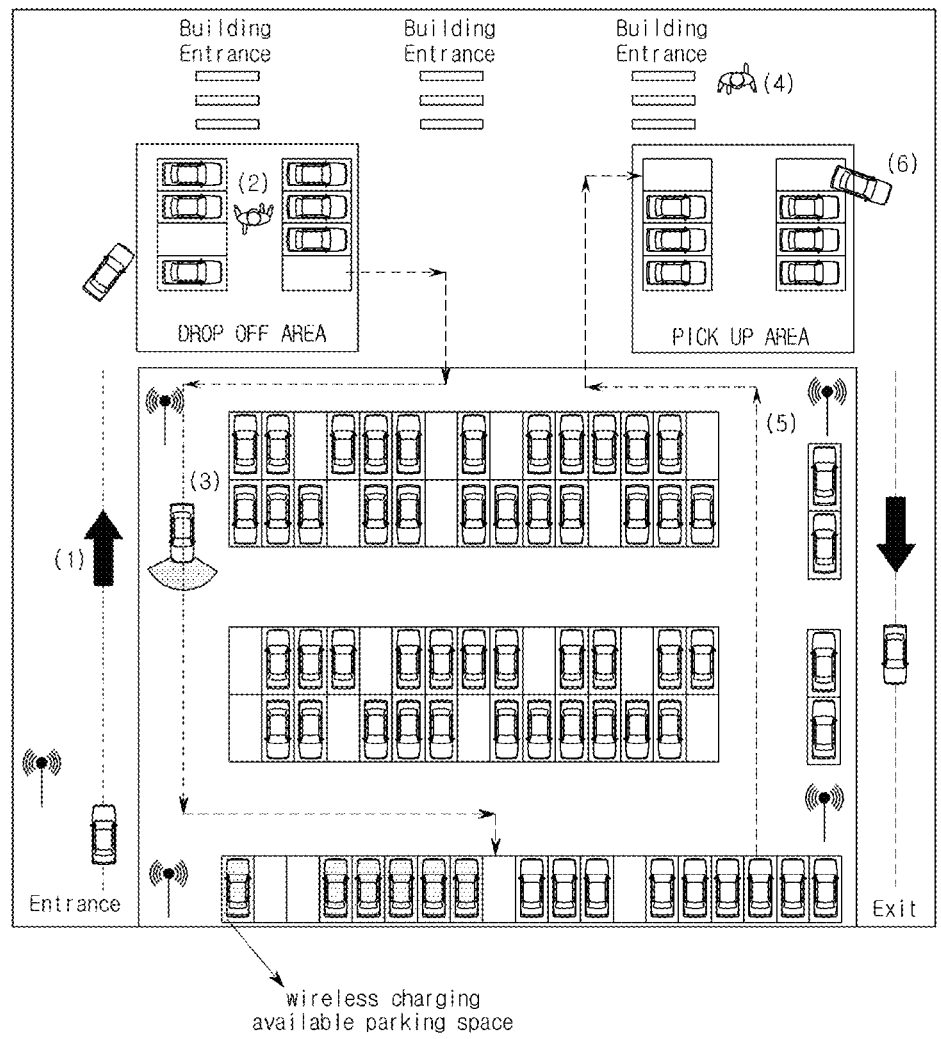
FIG. 8 is a conceptual diagram illustrating an automated valet parking system and method according to one form of the present disclosure.

FIG. 8 is a conceptual diagram illustrating an automated valet parking system and method according to one form of the present disclosure.

Referring to FIG. 8, a wireless charging service zone is illustrated.

Specifically, the wireless charging service zone is provided within a parking lot or facility and is divided into multiple sections each being equipped with wireless charging equipment. For example, the wireless charging equipment may be an electromagnetic induction coil that is buried under the ground or is installed on the surface of the ground within each charging section of the wireless charging service zone. When an electric vehicle (EV) is parked in one of the charging sections of the wireless charging service zone, the battery pack of the electric vehicle is wirelessly charged.

When the electric vehicle arrives at a drop-off zone, it is determined whether the electrical charging of the electric vehicle is needed or not. The determination is made by the driver of the electric vehicle. Alternatively, the determination may be made by the built-in processor unit of the vehicle or the infrastructure. For example, the state of charge (SoC) of the electric vehicle is lower than a predetermined level (expressed in units of percentage), it is determined that the electrical charging of the electric vehicle is needed. Alternatively, regardless of the SoC of the electric vehicle, the driver of the electric vehicle can make a request for charging of the electric vehicle with respect to the infrastructure.

When it is determined that the charging of the electric vehicle is desired, the electric vehicle moves to the wireless charging service zone along a route denoted by (1) in FIG. 8. In this case, at the time of determining a target position of the vehicle, the infrastructure determines an empty section in the wireless charging service zone as a first target position. After the determination, the infrastructure transmits to the electric vehicle the first target position and a first guide route that guides the electric vehicle to the first target position.

Along the route denoted by (1), the electric vehicle autonomously drives to the empty section which is set as the target position and performs parking there.

When the electric vehicle is parked in the determined section of the wireless charging service zone, the wireless charging of the electric vehicle is performed.

The electric vehicle monitors the SoC thereof. When the SoC reaches the predetermined level (i.e., percentage), the wireless charging is stopped.

(2) denotes a route along which the electric vehicle moves to an empty parking space from the wireless charging service zone after the wireless charging of the electric vehicle is completed. In this case, at the time of determining a target position of the vehicle, the infrastructure determines an empty parking space as a second target position. After the determination, the infrastructure transmits to the electric vehicle the second target position and a second guide route that guides the electric vehicle to the second target position.

Along the route denoted by (2), the electric vehicle autonomously drives to the empty parking space set as the second target position and performs autonomous parking there.

After the autonomous valet parking of the electric vehicle in the empty parking space is completed, the automated valet parking procedure ends.

Figure 9:
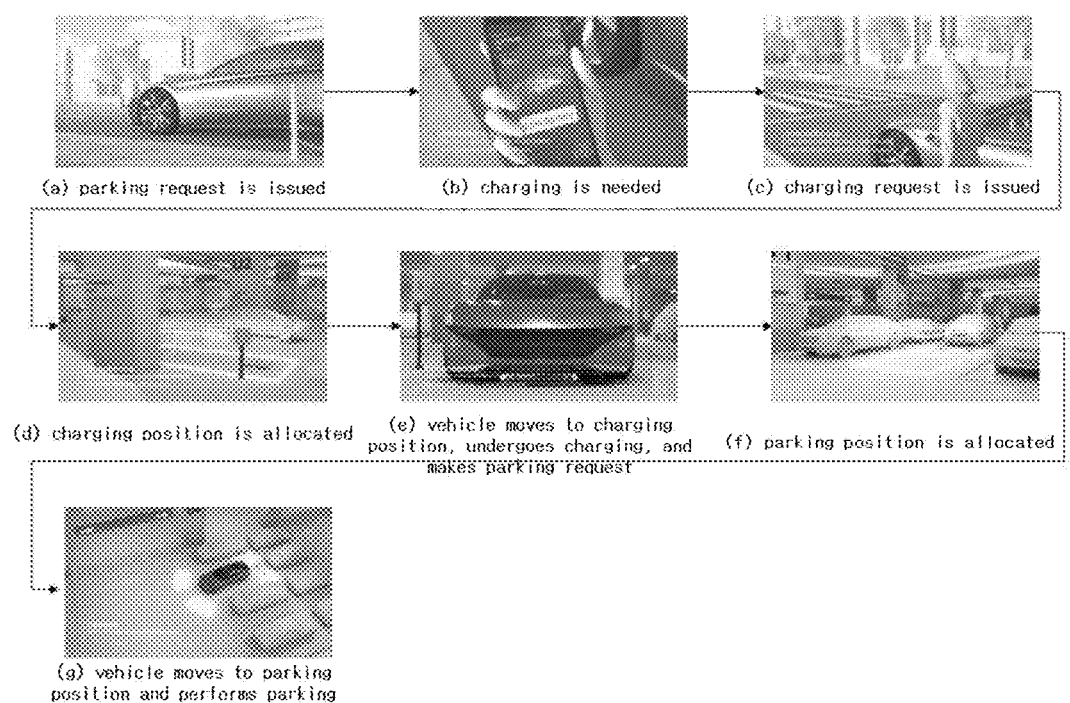
FIG. 9 is a conceptual diagram illustrating an automated valet parking method according to one form of the present disclosure.

FIG. 9 is a conceptual diagram illustrating an automated valet parking method according to one form of the present disclosure.

Referring to FIG. 9, an infrastructure receives a parking request from an electric vehicle (see picture (a)).

Next, it is determined whether charging of the electric vehicle is needed (see picture (b)).

Next, a charging request is received by the infrastructure (see picture (c)). The charging request is made by the driver of the electric vehicle or by the infrastructure.

Next, the infrastructure allocates a charging position to the electric vehicle (see picture (d)). The charging position may be a parking space equipped with wireless charging equipment among multiple parking spaces within a parking lot. The infrastructure sets the parking space where wireless charging is available as a first target position and transmits the first target position and a guide route to the vehicle.

The vehicle autonomously drives to the first target position, performs parking in the first target position, and undergoes wireless charging in the first target position (see picture (e)). After the wireless charging is completed, the vehicle reports the completion of the wireless charging to the infrastructure and makes a request for transmission of a parking position.

The infrastructure allocates a new parking space to the vehicle (see picture (f)). The infrastructure sets an empty parking space among the multiple parking spaces in the parking lot as a second target position and transmits the second target position and a guide route to the vehicle.

The vehicle autonomously drives to the second target position and performs parking in the second target position (see picture (g)). After the autonomous valet parking of the electric vehicle in the empty parking space is completed, the automated valet parking procedure ends.

Figure 10:
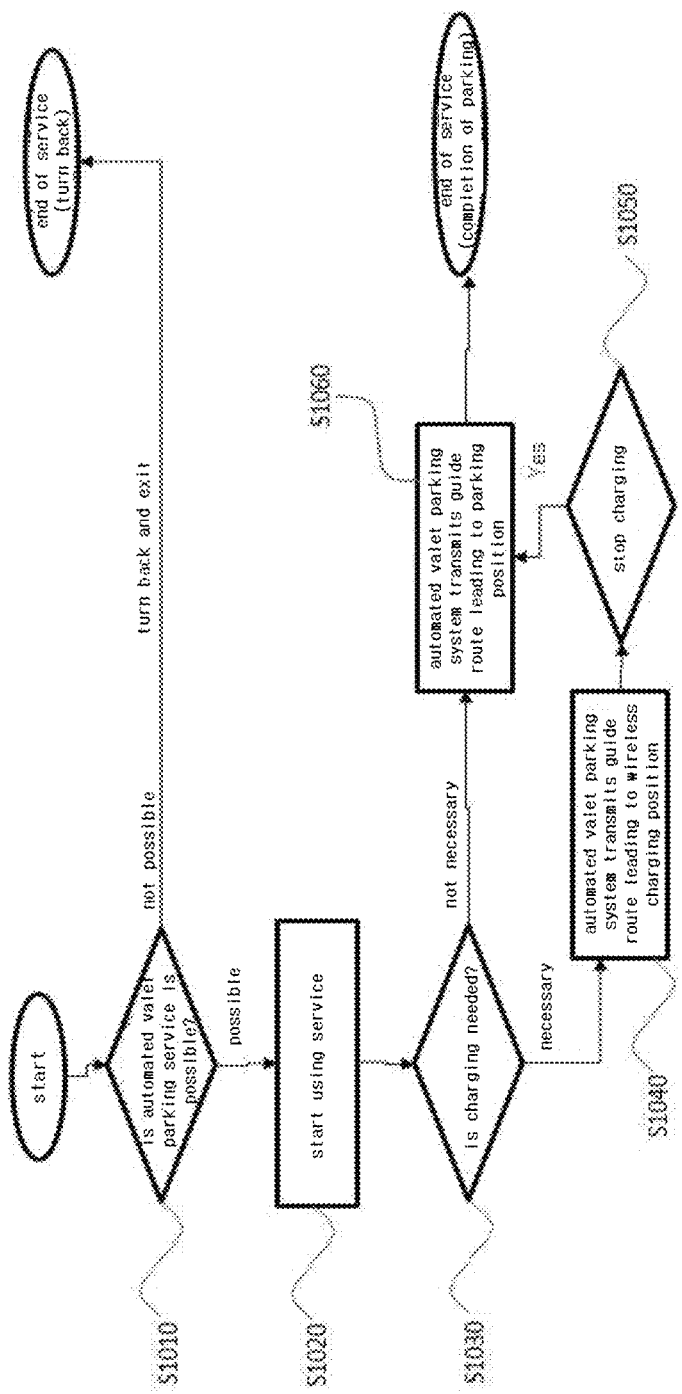
FIG. 10 is a flowchart illustrating an automated valet parking method according to one form of the present disclosure.

FIG. 10 is a flowchart illustrating an automated valet parking method according to one form of the present disclosure.

An infrastructure receives an automated valet parking service request from a vehicle (S1010).

The infrastructure determines whether it can offer an automated valet parking service to the vehicle. That is, the infrastructure determines whether an empty parking space is available. When it is determined that the service cannot be offered (i.e., there is no empty parking space), the result of the determination is reported to the vehicle. In this case, the vehicle drives through the parking lot.

Conversely, when it is determined that the service can be offered (i.e. there are empty parking spaces in the parking lot), an automated valet parking procedure is started (S1020).

When the vehicle is an electric vehicle, it is further determined whether the electric vehicle needs to be charged (S1030). When the charging of the electric vehicle is needed, a charging request is transmitted from the vehicle to the infrastructure. The determination of whether the charging of the electric vehicle is needed is made by the driver of the electric vehicle or by the infrastructure.

When the charging of the electric vehicle is not required, the electric vehicle performs a normal automated valet parking process (S1060). That is, the infrastructure sets an empty parking space as a target position for the vehicle, and transmits the target position and a guide route to the vehicle. The electric vehicle performs autonomous driving and autonomous parking on the basis of the target position and the guide route. In this way, the automated valet parking service is provided.

When the charging of the electric vehicle is desired, a wireless charging service is started (S1040). Specifically, the infrastructure sets a parking space equipped with wireless charging equipment as a first target position and transmits the first target position and a guide route to the vehicle. The vehicle autonomously drives to the first target position and performs autonomous parking in the first target position.

After the charging of the vehicle is completed (S1050), an automated valet parking service is started (S1060). The infrastructure sets an empty parking space among multiple parking spaces in the parking lot as a second target position and transmits the second target position and a guide route to the vehicle. The electric vehicle performs autonomous driving and autonomous parking on the basis of the target position and the guide route. In this way, the automated valet parking service is provided.

Figure 11:
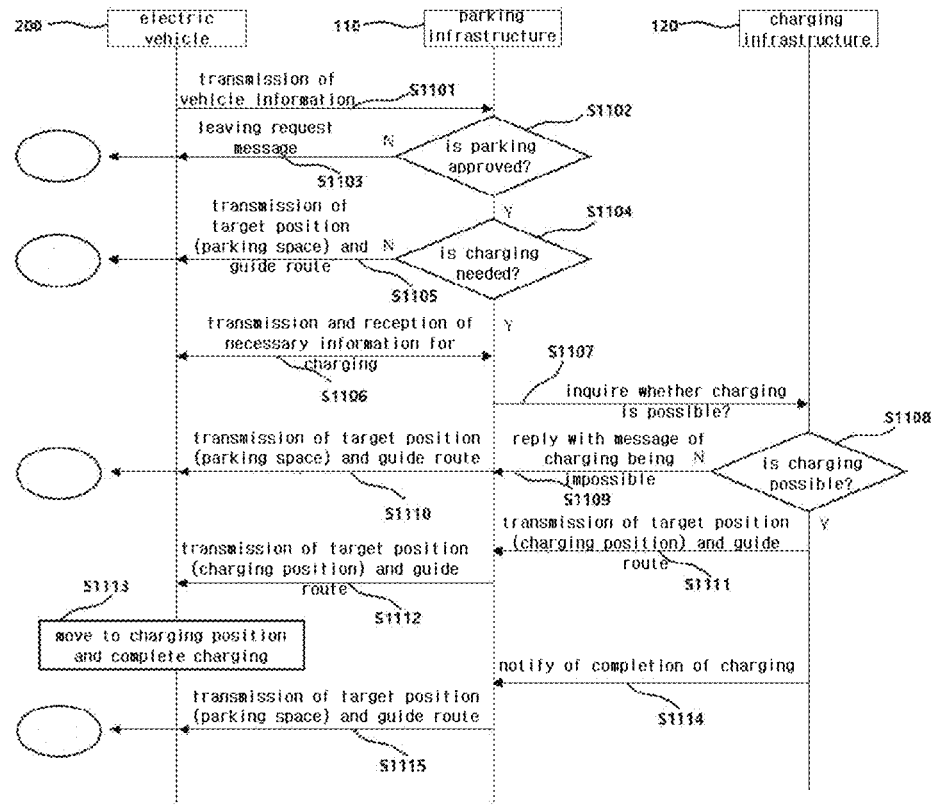
FIG. 11 is a conceptual diagram illustrating an automated valet parking system according to one form of the present disclosure and flow of information in the automated valet parking system.

FIG. 11 is a conceptual diagram illustrating an automated valet parking system according to one form of the present disclosure and flow of information in the automated valet parking system.

Referring to FIG. 11, the automated valet parking system according to one form of the present disclosure includes an electric vehicle 200, a parking infrastructure 110, and a charging infrastructure 120.

The electric vehicle 200 is a vehicle that is driven by an electric motor powered by a battery pack that can be recharged in a cable plugged manner or a wireless charging manner.

The parking infrastructure 110 is a parking facility or sensors installed in the parking facility. Alternatively, in some cases, the infrastructure 110 may be a control center that controls a parking lot gate, vehicles in a parking lot, etc.

The charging infrastructure 120 is a facility that enables wireless charging within the parking lot. For example, the charging infrastructure 120 may be a wireless charging station. The charging infrastructure 120 may be a control center for monitoring whether the electric vehicle 200 is an electrically rechargeable vehicle, the state of charge (SoC) of the electric vehicle 200, and the number of empty spaces within a wireless charging service station and for controlling the charging of the electric vehicle 200.

The target position refers to an empty space available for parking. Alternatively, the target position may refer to a pickup zone where a driver gets in his or her vehicle in a situation when the driver leaves the parking lot. Alternatively, the target position may refer to a parking space equipped with wireless charging equipment.

The guide route refers to a route along which the vehicle drives to reach the target position. For example, in an event of vehicle parking, the guide route refers to a route along which the vehicle drives from a drop-off zone to an empty parking space. For example, the guide route is provided in the form of instructions, for example, "driving a distance of 50 m and turning left at the next corner". Alternatively, the guide route may be a route from a drop-off zone to a parking space where a wireless charging service is available.

In the present form, a valet parking service and a charging service are not implemented by an integrated infrastructure but are implemented by two infrastructures, respectively. That is, in the form described above with reference to FIGS. 1 through 10, the parking infrastructure 110 and the charging infrastructure 120 are implemented by the integrated infrastructure 100 (see FIG. 1). However, in the form which will be described below with reference to FIG. 11, the parking infrastructure 110 and the charging infrastructure 120 are independent entities. This form is useful in a case of retrofitting an existing parking lot that can offer an automated valet parking service with an electric vehicle charging facility.

Referring to FIG. 11, vehicle information is transmitted from the electric vehicle 200 to the parking infrastructure 110 (S1101). The vehicle information is information by which the electric vehicle 200 can be distinguished from other electric vehicles. For electric vehicle, the vehicle information may be the vehicle identification number of the electric vehicle 200. Alternatively, the vehicle information may be identification information of the driver of the electric vehicle 200. Alternatively, the vehicle information may include the size, type, built-in sensors, etc. of the electric vehicle 200.

The parking infrastructure 110 determines whether to approve parking of the electric vehicle 200 (S1102). When disapproving, the parking infrastructure 110 transmits a drive trough request to the electric vehicle 200 (S1103). When the drive trough request is received, the electric vehicle 200 moves out of the parking lot. At this time, the automated parking procedure for the electric vehicle 200 ends.

When approving the parking of the electric vehicle 200, the parking infrastructure 110 further determines whether electrical charging of the electric vehicle 200 is needed (S1104). When it is determined that the electrical charging of the electric vehicle 200 is not needed, the parking infrastructure 110 transmits a target position and a guide route to the electric vehicle 200 (S1105). Here, the target position and the guide route are related to an empty parking space. After receiving the target position and the guide route, the electric vehicle 200 performs autonomous driving to the empty parking space on the basis of the target position and the guide route and performs autonomous parking in the target position.

When the electrical charging of the electric vehicle 200 is needed, the electric vehicle 200 and the parking infrastructure 110 communicate to transmit and receive desired information for charging (S1106). The desired information for charging means information desired to charge the electric vehicle 200. For example, this information includes information on type of a charging port, the current state of charge (SoC), charging speed, whether wireless charging is possible, information for charging fee, etc of the electric vehicle 200.

The parking infrastructure 110 transmits an inquiry message to the charging infrastructure 120 to check whether the electrical vehicle can receive an electrical charging service (S1107).

Upon receiving the inquiry message, the charging infrastructure 120 determines that it can offer the electrical charging service to the electric vehicle (S1108). This determination is made on the basis of the desired information for charging. For example, when the wireless charging equipment installed in the parking lot is not compatible with the charging mechanism of the electric vehicle 200, it is determined that the charging of the electric vehicle 200 is not possible. The determination also can be made on the basis of information on the number of electric vehicles under being charged. For example, when all of the parking spaces equipped with the wireless charging equipment within the parking lot are occupied, it is determined that the charging of the electrical vehicle is not possible.

When the charging of the electric vehicle is not possible, the charging infrastructure 120 transmits a reply message of notifying the parking infrastructure 110 that the charging is impossible (S1109), and the parking infrastructure 110 transmits a target position and a guide route to the electric vehicle 200 (S1110). Here, the target position and the guide route are related to an empty parking space. After receiving the target position and the guide route, the electric vehicle 200 performs autonomous driving to the empty parking space on the basis of the target position and the guide route and performs autonomous parking in the target position.

When the charging of the electric vehicle is possible, the charging infrastructure 120 transmits a target position and a guide route to the parking infrastructure 110 (S1111). Here, the target position and the guide route are related to an empty parking space within the wireless charging service zone. Next, the parking infrastructure 110 transmits to the electric vehicle 200 the target position within the wireless charging service zone and the guide route for the target position (S1112). The electric vehicle 200 moves to the target position in the wireless charging service zone and undergoes wireless charging for certain duration (S1113).

Since the charging infrastructure 120 monitors the state of charge (SoC) of each of the electric vehicles, it can determine whether the charging of the electric vehicle is completed. When the charging of the electric vehicle is completed, the charging infrastructure 120 transmits a notification message of charging completion to the parking infrastructure 110 (S1114).

The parking infrastructure 110 transmits an empty parking space as a target position and a guide route for the empty parking space to the electric vehicle 200 (S1115). After receiving the target position and the guide route, the electric vehicle 200 performs autonomous driving to the empty parking space on the basis of the target position and the guide route and performs autonomous parking in the target position.

In one or more exemplary forms, the described functions may be implemented in the form of hardware, software, firmware, or any combination thereof. When implemented in the form of software, these functions may be stored on or transmitted to a computer-readable medium in the form of one or more instructions or codes. The computer-readable medium refers to any medium that can transfer a computer program from one computer to another. For example, it may be a communication medium or a computer-readable storage medium. The storage medium may be an arbitrary medium that can be accessed by a computer. The computer-readable media include, but are not limited to, RAMs, ROMs, EEPROMs, optical discs such as CD-ROM, magnetic disks, and any media that can be accessed by computers and which can be used to transfer a computer program in the form of instructions from one place to another. The computer-readable media are appropriately referred to as media that can be arbitrarily accessed by computers. For example, software can be transferred from a website, server or other remote sources through a cable or over a wireless channel. Examples of the cables include coaxial cable, fiber optic cable, twisted pair cable, and digital subscriber line (DSL). Examples of the wireless channel include infrared frequency waves, radio frequency waves, and ultrahigh frequency waves. In this case, the coaxial cable, the fiber optic cable, the twisted pair cable, the DL, and the wireless channels fall within the definition of the medium. The disks or discs include a compact disc (CD), a laser disc (LD), an optical disc (OD), a digital versatile disc (DVD), a floppy disk (FD), and a Blu-ray disc. Discs generally refer to media from which data is optically read and disks refer to media from which data is magnetically read. Combinations of the above-mentioned media also fall within the definition of the computer-readable medium.

When forms are implemented as program code or code segments, the code segment may be a procedure, function, subprogram, program, routine, subroutine, module, software package, class, instructions, data structures, program command strings, or an arbitrary set of program command strings. One code segment may be connected with another code segment or a hardware circuit in a manner of transmitting and receiving information, data, arguments, parameters, or memory content. Information, arguments, parameters, data, and the like may be delivered, sent, or transmitted using any suitable means such as memory sharing, message delivery, token delivery, network transmission, and the like. In addition, in some aspects, steps and/or operations of a method or algorithm may reside on a mechanically readable medium and/or a computer-readable medium in the form of a combination or set of one or more codes and/or one or more instructions that can be integrated into a computer program product.

When implemented as software, the techniques described herein can be implemented as modules (for examples, procedures, functions, etc.) that perform the functions described herein. Software codes may be stored in a memory unit and may be executed by a processor. The memory unit may be embedded in a processor or may be provided outside a processor. In this case, the memory unit may be communicatively connected with the processor by various means known in the art.

When implemented as hardware, processing units may be implemented as one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electronic devices designed to perform the functions described herein, or any combination of these.

The above-mentioned ones include one or more exemplary forms. Of course, the above-described forms do not cover all possible combinations of components and/or methods to implement the present disclosure. Thus, those skilled in the art will appreciate that many further combinations and substitutions of components and/or methods in various forms are possible. Accordingly, the above-described forms cover all such alterations, modifications, and variations that fall within the spirit and scope of the appended claims. Moreover, as to the scope of the terms "comprises" used in the detailed description or the appended claims, it is noted that it is similarly interpreted as "comprising" that is used as a transitional word in the claims.

As used herein, the terms "infer" and "inference" generally refer to a process of determining or inferring a state of a system, environment, and/or user from a set of observations of events and/or data. Inferring can be used to identify a specific situation or action, or can generate a probability distribution of certain states, for example. Inferring is probabilistic. That is, inferring may mean a calculation of a probability distribution of those states, based on study on data and events. Inferring may involve techniques used to construct a higher level event from a set of events and/or data. The inference refers to a process of inferring new events or actions from a set of observed events and/or stored event data, determining whether events are closely correlated in time, and determining whether the events and data come from one or several events and data sources.

Moreover, terms such as "component", "module", and "system" used herein may refer to, not necessarily, computer entities such as hardware, firmware, any combination of hardware and software, software, and a software program being executed. For example, the term "component" may refer to, not necessarily, a process running on a processor, a processor, an object, an executable execution thread, a program, and/or a computer. By way of illustration, both an application running on a computing device and the computing device itself may fall within the definition of the component. One or more components may reside within a process and/or an execution thread. One or more components may be collectively provided in one computer or distributed in two or more computers. In addition, these components can be executed on various computer readable media having various data structures stored thereon. Components can communicate a signal containing one or more data packets (for example, data from an arbitrary component that interacts with a local system, a component of a distributed system, and/or other systems on the basis of a signal that is transmitted over a network such as Internet) with a local and/or remote process.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for providing automated valet parking in a parking lot, the method comprising:
receiving, by a parking infrastructure, a parking request from an electric vehicle;
determining, by the parking infrastructure, whether charging of the electric vehicle is needed; and
in response to determining that charging of the electric vehicle is needed, performing:
i) before providing a parking space to the electric vehicle, guiding, by the parking infrastructure, the electric vehicle to autonomously drive to a wireless charging service zone, and
ii) after wireless charging of the electric vehicle is completed in the wireless charging service zone, guiding, by the parking infrastructure, the electric vehicle to autonomously drive from the wireless charging service zone to a first empty parking space in the parking lot, wherein guiding the electric vehicle to autonomously drive to the wireless charging service zone before providing a parking space to the electric vehicle comprises:
setting, by the parking infrastructure, an empty space in the wireless charging service zone as a first target position, and
transmitting, by the parking infrastructure to the electric vehicle, the first target position and a first guide route that guides the electric vehicle to the empty space in the wireless charging service zone; and
wherein the method further comprises:
before guiding the electric vehicle to the wireless charging service zone, receiving, by the parking infrastructure, charging information from the electric vehicle, transmitting, by the parking infrastructure, an inquiry message to a charging infrastructure to check whether the electrical charging service can be offered to the electric vehicle in the wireless charging service zone, and receiving, by the parking infrastructure from the charging infrastructure, a reply message indicating whether or not an electric charging service can be offered to the electric vehicle in the wireless charging service zone, wherein the charging infrastructure determines, based on the charging information received from the electric vehicle, that the electric charging service cannot be offered to the electric vehicle when wireless charging equipment installed in the wireless charging service zone is not compatible with charging mechanism of the electric vehicle, and wherein:

when the charging infrastructure determines that the electric charging service cannot be offered to the electric vehicle, the reply message indicates that charging of the electric vehicle is not possible in the wireless charging service zone, and when the charging infrastructure determines that charging services can be offered to the electric vehicle, the reply message indicates the empty space in the wireless charging service zone.

2. The method according to claim 1, wherein determining whether charging of the electric vehicle is needed comprises determining that charging of the electric vehicle is needed when a state of charge (SoC) of the electric vehicle is at or below a predetermined level.

3. The method according to claim 1, further comprising:
performing autonomous driving, by the electric vehicle, to the first target position in the wireless charging service zone;
performing, by the electric vehicle, autonomous parking at the empty parking space in the wireless charging service zone; and
undergoing, by the electric vehicle, wireless charging at the first target position in the wireless charging service zone.

4. The method according to claim 1, wherein guiding the electric vehicle to the first empty parking space in the parking lot comprises transmitting, by the parking infrastructure to the electric vehicle, a second target position and a second guide route that guides the electric vehicle to the second target position, the second target position and the second guide route being related to the first empty parking space in the parking lot.

5. The method according to claim 4, further comprising:
performing, by the electric vehicle, autonomous driving to the third second target position;
performing, by the electric vehicle, autonomous parking in the first empty parking space in the parking lot; and
stopping an automated valet parking procedure of the electric vehicle.

6. The method according to claim 1, wherein the wireless charging service zone is configured such that an electromagnetic induction coil for wireless charging is installed on or under the ground thereof.

7. The method according to claim 1, further comprising, when the reply message from the charging infrastructure indicates that charging of the electric vehicle is not possible in the wireless charging service zone, transmitting, by the parking infrastructure to the electric vehicle, a second target position and a second guide route that guides the electric vehicle to the second target position, the second target position and second guide route being related to the first empty parking space in the parking lot.

8. A system for providing automated valet parking in a parking lot, the system comprising:
a parking infrastructure configured to:
receive vehicle information from an electric vehicle,
determine whether charging of the electric vehicle is needed,
in response to determining that charging of the electric vehicle is needed, perform:
i) before providing a parking space to the electric vehicle, guide the electric vehicle to autonomously drive to a wireless charging service zone, and
ii) after wireless charging of the electric vehicle is completed in the wireless charging service zone, guide the electric vehicle to autonomously drive from the wireless charging service zone to a first empty space in the parking lot, wherein the parking infrastructure is configured to i) set an empty space in the wireless charging service zone as a first target position and ii) transmit the first target position and a first guide route that guides the electric vehicle to the empty space in the wireless charging service zone,
receive charging information from the electric vehicle,
transmit an inquiry message to a charging infrastructure to check whether the electrical charging service can be offered to the electric vehicle in the wireless charging service zone, and
receive, from the charging infrastructure, a reply message indicating whether or not an electric charging service can be offered to the electric vehicle in the wireless charging service zone, wherein
the charging infrastructure is configured to determine, based on the charging information received from the electric vehicle, that the electric charging service cannot be offered to the electric vehicle when wireless charging equipment installed in the wireless charging service zone is not compatible with charging mechanism of the electric vehicle, and wherein:
when the charging infrastructure determines that the electric charging service cannot be offered to the electric vehicle, the reply message indicates that charging of the electric vehicle is not possible in the wireless charging service zone, and
when the charging infrastructure determines that charging services can be offered to the electric vehicle, the reply message indicates the empty space in the wireless charging service zone.

9. The system according to claim 8, wherein the parking infrastructure is configured to transmit to the electric vehicle a second target position and a second guide route when it is determined that the charging of the electric vehicle is not needed, the second target position and the second guide route being related to the first empty parking space in the parking lot.

10. The system according to claim 8, the charging infrastructure is configured to determine, based on charging information received from the electric vehicle, whether the electric charging service can be offered for the electric vehicle.

11. The system according to claim 8, wherein the parking infrastructure is configured to transmit a second target position and a second guide route to the electric vehicle when the charging service for the electric vehicle cannot be offered, the second target position and the second guide route being to the first empty parking space in the parking lot.

12. The system according to claim 8, wherein the parking infrastructure is configured to, when the reply message from the charging infrastructure indicates that charging of the electric vehicle is not possible in the wireless charging service zone, transmit a second target position and a second guide route that guides the electric vehicle to the second target position, the second target position and second guide route being related to the first empty parking space in the parking lot.

\* \* \* \* \*

UNITED STATES PATENT AND TRADEMARK OFFICE
CERTIFICATE OF CORRECTION

Page 1 of 1

PATENT NO.        : 11,642,975 B2
APPLICATION NO.   : 16/724715
DATED             : May 9, 2023
INVENTOR(S)       : Sung Won Yoon It is certified that error appears in the above-identified patent and that said Letters Patent is hereby corrected as shown below:

In the Claims

Column 19 Claim 5, Line 52: "third" should have been deleted.

Signed and Sealed this
Twenty-seventh Day of June, 2023

Katherine Kelly Vidal
*Director of the United States Patent and Trademark Office*